(12) United States Patent
Zhao

(10) Patent No.: US 7,991,863 B2
(45) Date of Patent: Aug. 2, 2011

(54) METHOD AND DEVICE FOR REQUESTING AND ALLOCATING CONNECTION POINT ADDRESS

(75) Inventor: Yuping Zhao, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 124 days.

(21) Appl. No.: 12/605,784

(22) Filed: Oct. 26, 2009

(65) Prior Publication Data

US 2010/0042707 A1 Feb. 18, 2010

Related U.S. Application Data

(63) Continuation of application No. PCT/CN2008/071728, filed on Jul. 23, 2008.

(30) Foreign Application Priority Data

Jul. 25, 2007 (CN) .......................... 2007 1 0137851

(51) Int. Cl.
*G06F 15/177* (2006.01)
*H04L 12/28* (2006.01)

(52) U.S. Cl. ........................ 709/221; 709/220; 370/351

(58) Field of Classification Search .................. 709/220, 709/221, 222, 225, 229; 370/310, 328, 331, 370/338, 351, 389, 466; 726/4
See application file for complete search history.

(56) References Cited

U.S. PATENT DOCUMENTS

| 6,904,033 | B1 | 6/2005 | Perras et al. | |
|---|---|---|---|---|
| 2003/0208602 | A1* | 11/2003 | Bhalla et al. | 709/227 |
| 2005/0232228 | A1* | 10/2005 | Dharanikota et al. | 370/351 |
| 2007/0204330 | A1* | 8/2007 | Townsley et al. | 726/4 |
| 2009/0207819 | A1* | 8/2009 | Kroselberg et al. | 370/338 |

FOREIGN PATENT DOCUMENTS

| CN | 1359244 | | 7/2002 |
|---|---|---|---|
| CN | 1450766 | A | 10/2003 |
| CN | 1458761 | A | 11/2003 |
| CN | 1787539 | A | 6/2006 |
| CN | 1798158 | A | 7/2006 |
| CN | 1845554 | | 10/2006 |
| CN | 1937632 | A | 3/2007 |
| CN | 101355474 | B | 7/2007 |
| WO | WO 2007/044869 | A1 | 4/2007 |

OTHER PUBLICATIONS

English translation of the Written Opinion of the International Searching Authority for International application No. PCT/CN2008/071728, mailed Nov. 6, 2008, 4 pgs.

Second Office Action of the State Intellectual Property Office of the PRC for application No. 200710137851.0, dated Feb. 12, 2010, 8 pgs., partial English translation attached.

(Continued)

*Primary Examiner* — Peling A Shaw

(74) *Attorney, Agent, or Firm* — Finnegan, Henderson, Farabow, Garrett & Dunner LLP

(57) ABSTRACT

The present invention relates to mobile communications, and discloses a method and device for requesting and allocating connection point addresses. Therefore, transmission errors of subsequent messages of a terminal are avoided when the MIP registration of the terminal fails. The method includes: receiving a request for an IP address from a terminal and a MIP registration result of the terminal; and returning a response indicative of IP address allocation failure if the registration result is registration failure.

18 Claims, 7 Drawing Sheets

OTHER PUBLICATIONS

European Patent Office Communication including the supplementary European search report (Art. 153(7) EPC) and the European search opinion for application No. 08773233.5, 6 pgs.

Leung, K. et al., "WiMAX Forum/3GPP2 Proxy Mobile IPv4", draft-leung-mip4-proxy-mode-03.txt, MIP4, Internet-Draft; Jul. 3, 2007, 52 pgs.

WiMAX Forum Network Architecture (Stage 3: Detailed Protocols and Procedures); Release 1.0.0, Mar. 28, 2007, WiMax Forum Proprietary, 2007, 516 pgs.

Droms, R., "Dynamic Host Configuration Protocol", Network Working Group, Mar. 1997, 41 pgs.

\* cited by examiner

METHOD AND DEVICE FOR REQUESTING AND ALLOCATING CONNECTION POINT ADDRESS

CROSS-REFERENCE TO RELATED APPLICATIONS

This application is a continuation of International Application No. PCT/CN2008/071728, filed on Jul. 23, 2008, which claims priority to Chinese Patent Application No. 200710137851.0, filed on Jul. 25, 2007, both of which are hereby incorporated by reference in their entireties.

FIELD OF THE INVENTION

The present invention relates to mobile communications, and in particular, to a technology for requesting and allocating connection point addresses.

BACKGROUND OF THE INVENTION

Nowadays, the scale of the Internet is expanding at an amazing speed along with the fast development of mobile communications. More and more mobile subscribers expect to access the Internet more flexibly without being restricted by time or space. To meet the requirement, a Mobile Internet Protocol (MIP) technology emerges. MIP is a new interconnection technology that supports the connection between a mobile subscriber and the Internet, and enables the mobile subscriber to move to another place without interrupting the ongoing Internet communication. MIP becomes a hot topic in the industry.

MIP allows a terminal to use two Internet Protocol (IP) addresses. The first address is a Home Address (HoA), which is fixed; and the second address is a Care-of Address (CoA), which changes at every new connection point. MIP allows a computer to roam freely on the Internet and on the intranet of an organization, without changing the HoA. Therefore, when the terminal changes the connection point of the computer, the communication goes on, and MIP updates the network according to the new location of the terminal.

MIP may route an IP packet to each connection point. Wherever the terminal is connected, the HoA of the terminal always identifies the terminal. If the terminal is outside the home network, the CoA needs to be associated with the HoA of the terminal. The CoA may provide the information about the current connection point of the terminal. The terminal may use an agent notification to detect when it moves from one subnet to another. When the terminal receives an agent notification indicating that the location has changed, the terminal performs registration through a foreign agent. FIG. 1 illustrates how a terminal performs MIP registration with a home agent through a foreign agent. First, the terminal sends a registration request to a future foreign agent, thus starting the registration procedures. After processing the registration request, the foreign agent relays the request to the home agent. The home agent sends a registration response to the foreign agent to accept or reject the request. After processing the registration response, the foreign agent relays the response to the terminal, indicating the state of processing the request.

The connection point addresses are allocated through a Dynamic Host Configuration Protocol (DHCP). As shown in FIG. 2, the allocation process includes four stages: discovery stage, in which the DHCP client searches for the DHCP server; provision stage, in which the DHCP server provides an IP address; selection stage, in which the DHCP client selects an IP address provided by a DHCP server; and confirmation stage, in which the DHCP server confirms the provided IP address.

Currently, the Proxy Mobile IP (PMIP) protocol derived from MIP is also a mobile technology protocol. In PMIP, the terminal does not provide the MIP function. Many of MIP functions are implemented by a foreign agent that has the PMIP client capabilities. The PMIP client needs to participate in both exchanging the MIP registration messages and allocating an IP address to the terminal, as shown in FIG. 3. The terminal broadcasts a DHCP Discover message. A DHCP relay intercepts the DHCP Discover message, and forwards the message to the DHCP server according to the configuration information. After receiving the DHCP Discover message, the DHCP server sends a DHCP Offer message to the terminal. The provided IP address is carried in this DHCP Offer message. After the terminal receives the DHCP Offer message, if the terminal selects this IP address, the terminal sends a DHCP Request message to the DHCP server. After receiving the DHCP Request message, the DHCP server sends a response indicative of IP address allocation success to the terminal. After receiving the response, the DHCP relay prompts the PMIP client to initiate MIP registration procedures; that is, the PMIP client sends a MIP Registration Request (MIP Reg Req) to the home agent. After receiving a MIP Registration Response (MIP Reg Res), the PMIP client triggers the DHCP relay to forward the DHCP Response message to the terminal.

However, the inventor of the present invention discovers that the existing DHCP relay is capable of forwarding only, and is unable to send a message initiatively or change the type of message optionally. Therefore, when receiving the information about MIP registration failure, the DHCP relay is unable to instruct the DHCP server to reclaim the address because it is unable to send messages initiatively; in addition, the DHCP relay is unable to convert an Acknowledgement (ACK) message into a Not Acknowledgement (NAK) message which is to be notified to the terminal, where the ACK message is sent from the DHCP server and indicative of IP address allocation success. Consequently, the terminal is unable to know unavailability of the address, and the transmission of subsequent messages of the terminal fails.

SUMMARY OF THE INVENTION

Embodiments of the present invention provide a method and device for requesting and allocating a connection point address to prevent transmission errors of subsequent messages of a terminal when the MIP registration of the terminal fails.

A method for requesting a connection point address includes: receiving a request for a selected IP address of a terminal; prompting MIP registration procedures of the terminal, and receiving a MIP registration result; and sending the request for the selected IP address with the MIP registration result to a DHCP server.

A method for allocating a connection point address includes: receiving a request for an IP address of a terminal and a MIP registration result of the terminal; and returning a response indicative of IP address allocation failure if the registration result is registration failure.

An access network device in an embodiment of the present invention includes: a first receiving unit, configured to receive a request for an IP address of a terminal; a registration triggering unit, configured to prompt MIP registration procedures of the terminal; a second receiving unit, configured to receive a MIP registration result of the terminal; and a first sending unit, configured to send the registration result received by the second receiving unit and the request for an IP address of the terminal to a device for allocating connection point addresses.

A device for allocating a connection point address in an embodiment of the present invention includes: a receiving unit, configured to receive a request for an IP address of a terminal and a MIP registration result of the terminal; a sending unit, configured to return an IP address allocation response to the terminal; and a first judging unit, configured to judge whether the MIP registration result received by the receiving unit is registration failure, and if so, instruct the sending unit to return a response indicative of IP address allocation failure to the terminal.

An access network device in an embodiment of the present invention includes: a first receiving unit, configured to receive a request for an IP address of a terminal; a second receiving unit, configured to receive a MIP registration result of the terminal; a first sending unit, configured to return an IP address allocation response to the terminal; and a first judging unit, configured to judge the results received by the first receiving unit and the second receiving unit, and instruct the first sending unit to return a response indicative of IP address allocation failure if the first receiving unit receives a request for an IP address of the terminal and the second receiving unit receives a registration result indicative of registration failure.

Compared with the prior art, the embodiments of the present invention bring the following differences and benefits:

After a request for an IP address is received from a terminal, an IP address allocation response is returned to the terminal according to the MIP registration result of the terminal; if the registration result of the terminal is registration failure, a response indicative of IP address allocation failure is returned to the terminal, thus preventing transmission errors of subsequent messages of the terminal when the MIP registration fails. Moreover, the terminal does not send the request for an IP address repeatedly in the case of receiving no response from the device for allocating a connection point address in a long period, thus saving transmission resources.

DETAILED DESCRIPTION OF THE INVENTION

To make the technical solution, objectives and merits of the embodiments of the present invention clearer, the following describes the embodiments of the present invention in detail with reference to accompanying drawings.

Figure 1:
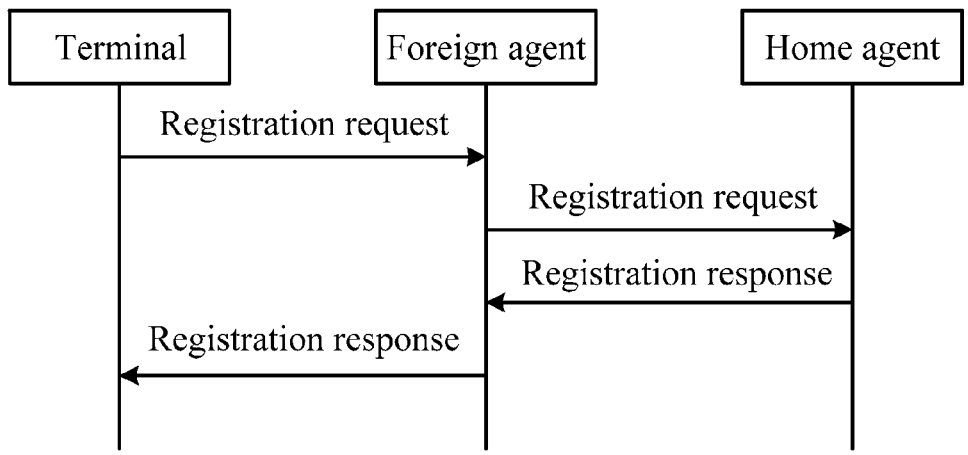
FIG. 1 shows how a terminal performs MIP registration with a home agent through a foreign agent in the prior art.
Figure 2:
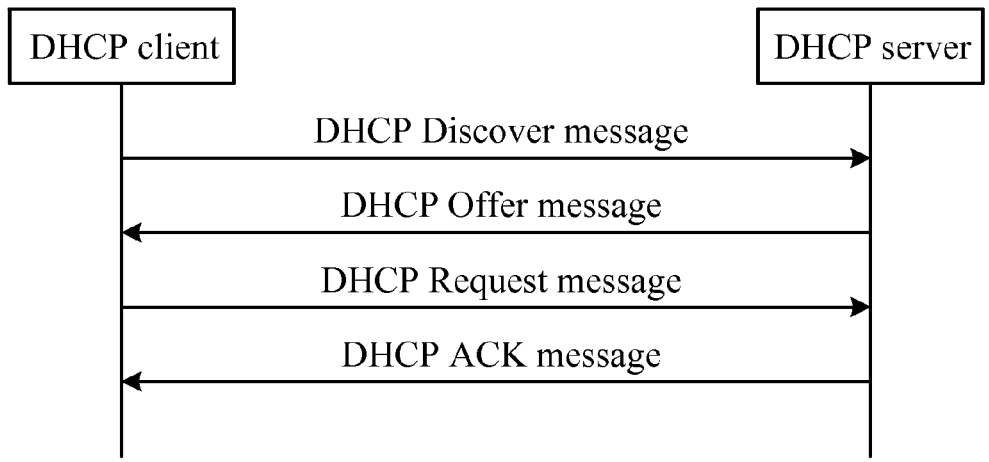
FIG. 2 is a sequence diagram of principles of DHCP in the prior art.
Figure 3:
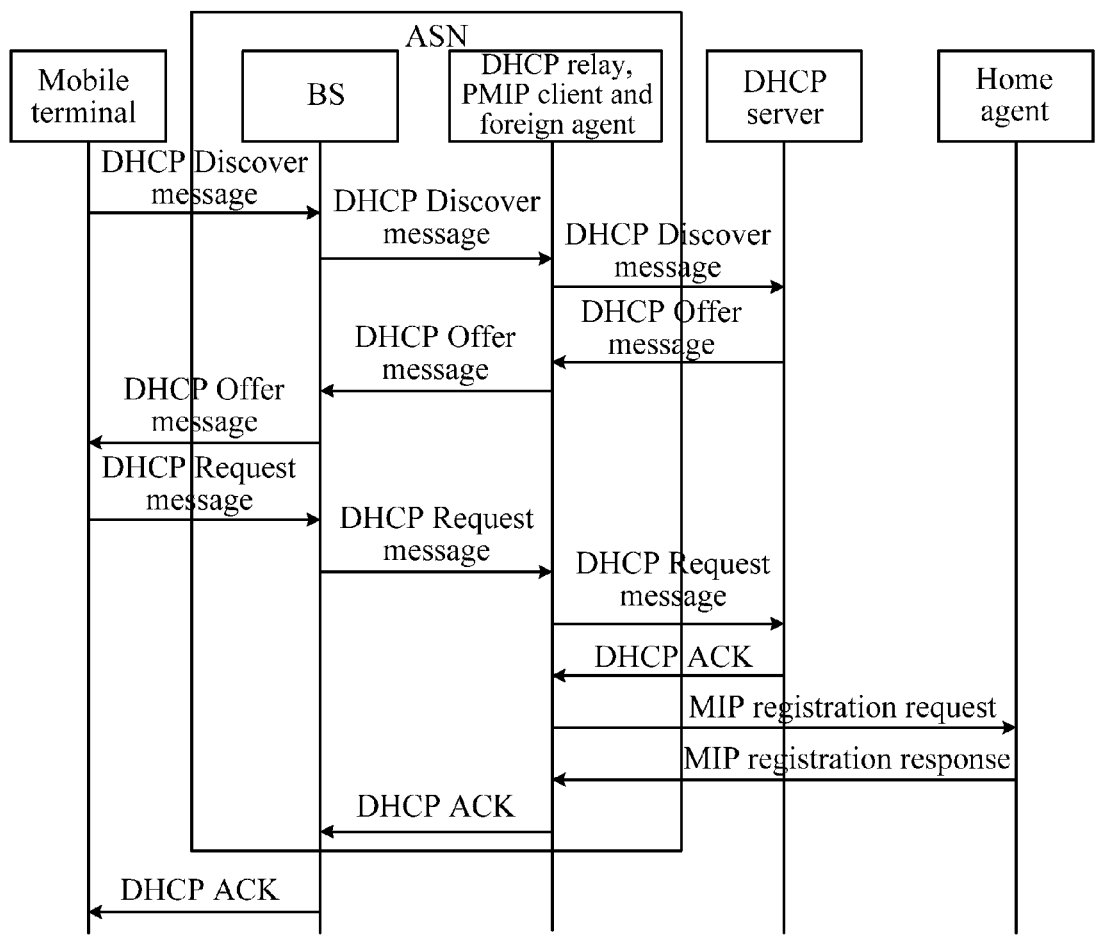
FIG. 3 is a flowchart of a PMIP client participating in both exchanging MIP registration messages and allocating an IP address to a terminal in the prior art.
Figure 4:
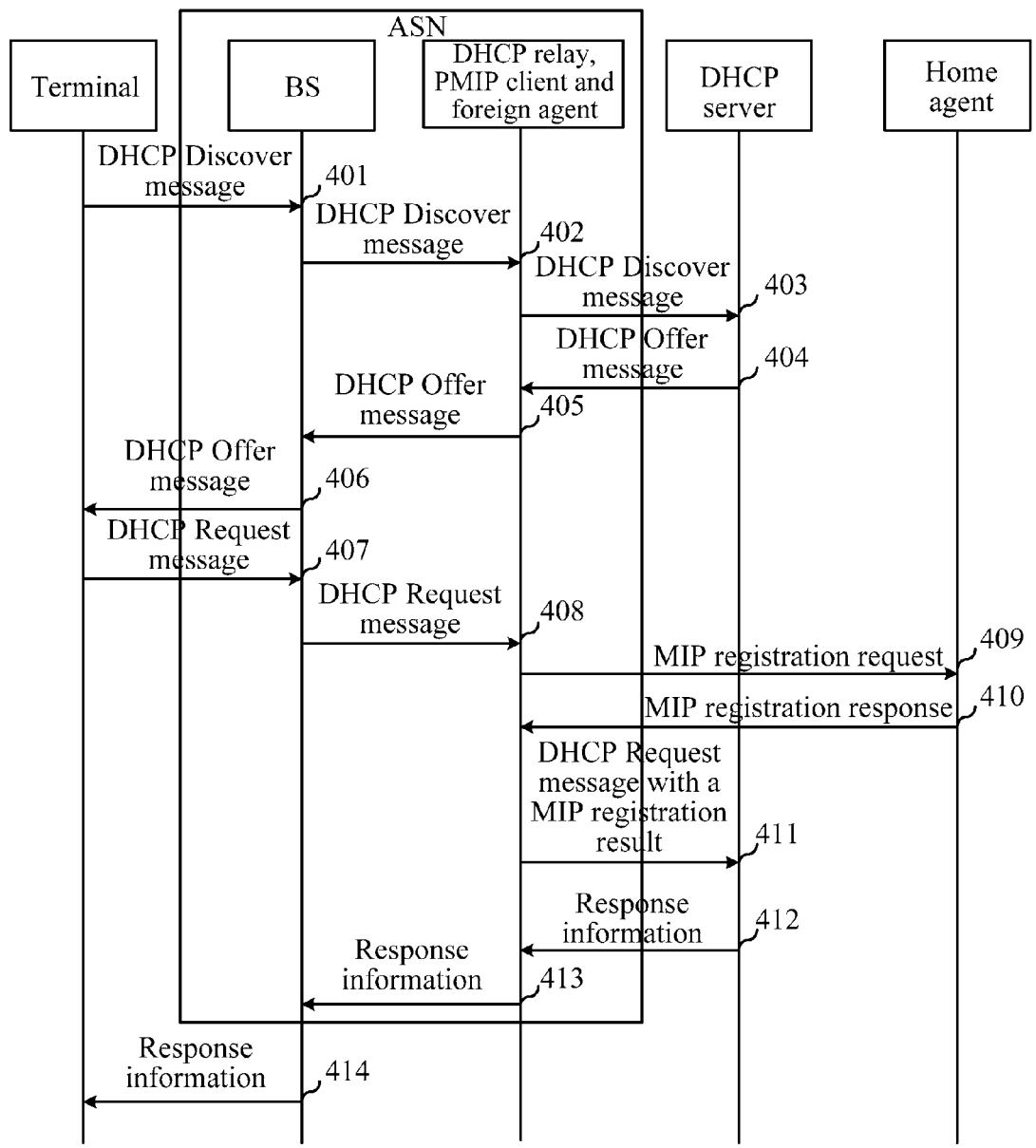
FIG. 4 is a flowchart of a method for allocating a connection point address according to embodiment 1 of the present invention.

The embodiment 1 of the present invention relates to a method for allocating a connection point address. In this embodiment, after receiving a request for an IP address from a terminal, the DHCP relay prompts MIP registration procedures of the terminal, receives a MIP registration result, and sends the registration result and the DHCP Request message of the terminal to the DHCP server, as shown in FIG. 4. The DHCP relay, the PMIP client and the foreign agent may be located on the same device or on multiple interconnected devices.

In 401, the terminal broadcasts a DHCP Discover message to the network.

Subsequently in 402, the Base Station (BS) forwards the DHCP Discover message broadcasted by the terminal to the DHCP relay.

In 403, the DHCP relay intercepts the DHCP Discover message forwarded by the BS, and then sends the message to the DHCP server. For example, after intercepting the DHCP Discover message forwarded by the BS, the DHCP relay changes the destination IP address of the message from the broadcast format to the unicast format, sets the relay address field in the message, and then sends the message to the DHCP server according to the configuration information. Generally, the configuration information is delivered from an Authentication, Authorization and Accounting (AAA) server, but may also be configured statically.

Subsequently in 404, the DHCP server sends a DHCP Offer message to the DHCP relay. That is, the DHCP server with an idle IP address sends a DHCP Offer message in response to the received DHCP Discover message. The IP address provided by the DHCP server is carried in the DHCP Offer message, and this IP address is used by the terminal as its HoA.

In 405, the DHCP relay forwards the DHCP Offer message to the BS.

Subsequently in 406, the BS sends the received DHCP Offer message to the terminal.

In 407, after receiving the DHCP Offer message, the terminal sends a DHCP Request message to the DHCP server. If the terminal receives responses from several DHCP servers at this time, the terminal selects a DHCP Offer message according to certain rules (for example, the first message that arrives), and broadcasts a DHCP Request message, notifying all DHCP servers that the terminal specifies a DHCP server from which the IP address will be received.

Subsequently in 408, the BS sends the received DHCP Request message to the DHCP relay.

In 409, after receiving the DHCP Request message, the DHCP relay prompts the PMIP client to initiate the MIP registration procedures of the terminal. After using the HoA information obtained through the DHCP server to construct a MIP registration request, the PMIP client sends the registration request to the home agent. The HoA and the CoA of the terminal are carried in the request.

In 410, the home agent sends a registration response message to the PMIP client. That is, the home agent sends a MIP registration result of the terminal to the PMIP client.

Subsequently in 411, the DHCP relay sends a DHCP Request message to the DHCP server, with the MIP registration result being carried in the DHCP Request message. A new suboption may be added to Option 82, which indicates the relay information, in the DHCP Request message, and the MIP registration result is transmitted through the newly added suboption; or, a new option indicative of the registration result may be added to the DHCP Request message directly, and the MIP registration result is transmitted through the newly added option. The MIP registration result may be carried in the suboption of an option indicative of relay information in the DHCP Request message, or carried in the option indicative of the registration result in the DHCP Request message, and is sent to the DHCP server. This practice involves few modifications to the existing protocol, and is rather convenient.

In 412, after receiving the DHCP Request message, the DHCP server sends an IP address allocation response back to the DHCP relay.

More specifically, after receiving the DHCP Request message, the DHCP server obtains the MIP registration result of the terminal from the DHCP Request message. Subsequently, the DHCP server judges whether the MIP registration result of the terminal is registration success, whether the IP address requested by the terminal is unallocated, and whether the terminal meets the conditions for allocating the IP address. If the MIP registration result of the terminal is registration success, and the IP address requested by the terminal is unallocated, and the terminal meets the conditions for allocating an IP address, the DHCP server returns an ACK response to the terminal, indicating that the IP address is allocated successfully, namely, indicating that the DHCP server has allocated the IP address to the terminal and the IP address lease takes effect. If the MIP registration result of the terminal is registration failure, or the IP address requested by the terminal has been allocated, or the terminal does not meet the conditions for allocating the IP address, the DHCP server returns a NAK response to the terminal, indicating that the IP address allocation fails, namely, indicating that the DHCP server has not allocated such IP address to the terminal.

Therefore, after receiving a request for an IP address from the terminal, the DHCP relay initiates the MIP registration procedures of the terminal, and sends the MIP registration result together with the request for an IP address of the terminal to the DHCP server. If the MIP registration result received by the DHCP server is registration failure, the DHCP server returns a NAK response to the terminal directly, indicating that the IP address allocation fails. In this way, transmission errors of subsequent messages of the terminal never occur when the MIP registration fails. Moreover, the terminal does not send the request for an IP address repeatedly in the case of receiving no response from the DHCP server in a long period, thus saving transmission resources. The MIP registration result is sent to the DHCP server, thus preventing the DHCP server from ineffectively allocating IP addresses when the terminal registration fails, and saving IP address resources.

In 413, the DHCP relay forwards the IP address allocation response of the DHCP server to the BS.

It should be noted that if the response received by the DHCP relay is a NAK response indicative of IP address allocation failure, but the MIP registration result is registration success, the DHCP relay still needs to prompt the DHCP client to initiate MIP registration cancellation procedures for the terminal, with a view to preventing transmission errors of subsequent messages of the terminal.

Subsequently in 414, the BS sends the IP address allocation response of the DHCP server to the terminal. The terminal uses this allocated IP address to transmit subsequent messages.

Figure 5:
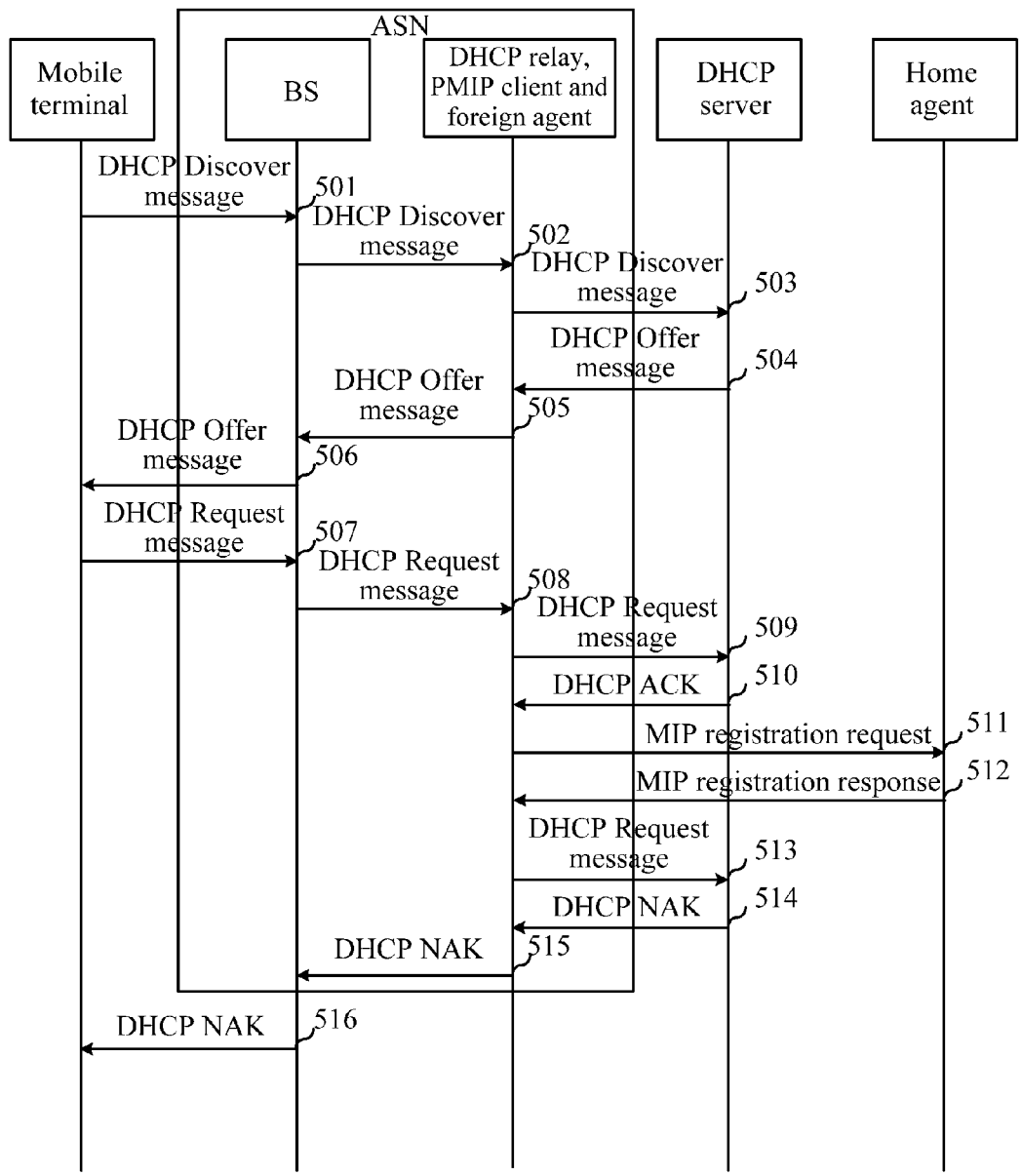
FIG. 5 is a flowchart of a method for allocating a connection point address according to embodiment 2 of the present invention.

The embodiment 2 of the present invention also relates to a method for allocating a connection point address, and differs from the embodiment 1 in that: In the embodiment 1, after receiving the DHCP Request, the DHCP relay prompts the PMIP client to initiate MIP registration procedures of the terminal; in the embodiment 2, after receiving the DHCP Request, the DHCP relay forwards the request to the DHCP server which allocates an IP address and sends a response, and, after receiving the response indicative of IP address allocation success, the DHCP relay prompts the PMIP client to initiate the MIP registration procedures of the terminal. If the MIP registration result is registration success, the DHCP relay forwards the response indicative of IP address allocation success to the BS; if the MIP registration result is registration failure, the DHCP relay sends a DHCP Request message to the DHCP server again, and a MIP registration result is carried in this message. After receiving the message, the DHCP server returns a response indicative of IP address allocation failure to the terminal, and reclaims the allocated IP address, as shown in FIG. 5.

In this embodiment, 501-512 are based on the prior art, and are not described further.

In 513, if a response indicative of MIP registration failure is received from the home agent, the DHCP relay sends a DHCP Request message to the DHCP server again, and the MIP registration failure information is carried in this message. A new suboption may be added to Option 82, which indicates the relay information, in the DHCP Request message, and the MIP registration result is transmitted through the newly added suboption; or, a new option indicative of the registration result may be added to the DHCP Request message directly, and the MIP registration result is transmitted through the newly added option.

Subsequently in 514, after receiving the DHCP Request message again, the DHCP server reclaims the allocated IP address according to the received MIP registration failure information, and sends a NAK response indicative of IP address allocation failure to the terminal, thus avoiding a waste of IP address resources.

In 515, after receiving the NAK response indicative of IP address allocation failure, the DHCP relay forwards the response to the BS.

In 516, the BS sends the NAK response indicative of IP address allocation failure to the terminal. In this way, transmission errors of subsequent messages of the terminal never occur when the MIP registration of the terminal fails. Moreover, the terminal does not send the request for an IP address repeatedly in the case of receiving no response from the DHCP server in a long period, thus saving transmission resources.

The MIP registration procedures of the terminal may be initiated immediately after the request for an IP address is received from the terminal, and the MIP registration result can be sent together with this request to the DHCP server; or, the request for IP address of the terminal is sent to the DHCP server before the MIP registration procedures of the terminal is initiated. If the response returned by the DHCP server is IP address allocation success and the MIP registration result is registration failure, the registration result has been carried in the request for IP address of the terminal, and sent to the DHCP server again. In this way, the implementation is flexible and the application is convenient.

Figure 6:
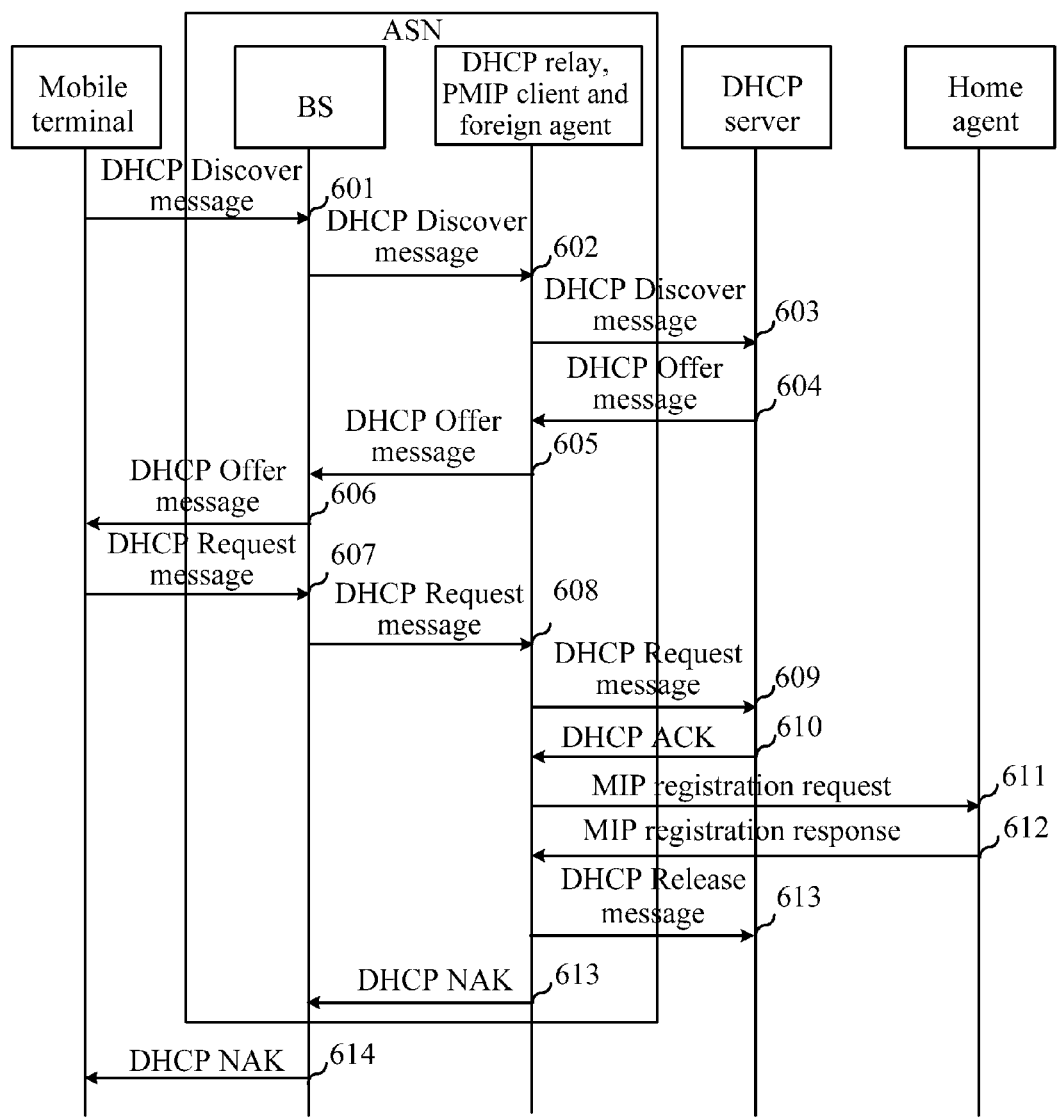
FIG. 6 is a flowchart of a method for allocating a connection point address according to embodiment 3 of the present invention.

The embodiment 3 of the present invention also relates to a method for allocating a connection point address, and differs from the embodiment 2 in that: In the embodiment 2, if the MIP registration result is registration failure, the DHCP relay sends a DHCP Request message to the DHCP server again, and the MIP registration result is carried in this message. After receiving this message, the DHCP server returns a response indicative of IP address allocation failure to the terminal, and reclaims the allocated IP address; in the embodiment 3, if the response returned by the DHCP server is an ACK and the MIP registration result is registration failure, the DHCP relay sends a DHCP Release message to the DHCP server. Meanwhile, the DHCP relay sends a NAK response indicative of IP address allocation failure to the terminal. After receiving the DHCP Release message, the DHCP server reclaims the allocated IP address, as shown in FIG. 6.

601-612 in the embodiment 3 are the same as 501-512 in the embodiment 2, and are not described further.

In 613, if a response indicative of MIP registration failure is received from the home agent, the DHCP relay sends a DHCP Release message to the DHCP server and sends a response indicative of IP address allocation failure to the terminal. After receiving the DHCP Release message, the DHCP server reclaims the allocated IP address.

In 614, the BS sends a NAK response indicative of IP address allocation failure to the terminal. The DHCP relay makes a judgment according to the MIP registration result. If the registration result is registration failure, after the DHCP server returns an ACK response indicative of IP address allocation success, the DHCP relay modifies the response from ACK to NAK, and therefore, the terminal will not receive an incorrect response when the MIP registration fails, and the transmission of subsequent messages of the terminal will not be erroneous. When modifying the ACK response, the DHCP relay sends a message indicative of IP address release to the DHCP server, thus preventing the idleness and waste of the IP address resources of the DHCP server.

The embodiment 4 of the present invention also relates to a method for allocating a connection point address, and differs from the embodiment 1 in that: The embodiment 4 is applicable to renewed lease of the IP address, in which case the terminal does not need to send a DHCP Discover message to the DHCP server again, but only needs to send a DHCP Request message. After receiving the request message, the DHCP relay prompts the PMIP client to initiate MIP registration procedures of the terminal and receives a MIP registration result. The DHCP relay sends the registration result and the DHCP Request message of the terminal to the DHCP server.

The embodiment 5 of the present invention also relates to a method for allocating a connection point address, and differs from the embodiment 2 in that: The embodiment 5 is applicable to renewed lease of the IP address, in which case the terminal does not need to send a DHCP Discover message to the DHCP server again, but only needs to send a DHCP Request message directly. After sending this request message to the DHCP server, the DHCP relay receives the response from the DHCP server, and prompts the PMIP client to initiate MIP registration procedures of the terminal and receives a MIP registration result. If the response returned by the DHCP server is an ACK and the MIP registration result is registration failure, the DHCP relay sends a DHCP Request message and the registration result to the DHCP server again. The DHCP server returns a NAK response to the terminal according to the registration result, and reclaims the allocated IP address.

The embodiment 6 of the present invention also relates to a method for allocating a connection point address, and differs from the embodiment 3 in that: The embodiment 6 is applicable to renewed lease of the IP address, in which case the terminal does not need to send a DHCP Discover message to the DHCP server again, but only needs to send a DHCP Request message directly. After sending this request message to the DHCP server, the DHCP relay receives the response from the DHCP server, and prompts the PMIP client to initiate MIP registration procedures of the terminal and receives a MIP registration result. If the response returned by the DHCP server is an ACK and the MIP registration result is registration failure, the DHCP relay sends a DHCP Release message to the DHCP server, and sends a response indicative of IP address allocation failure to the terminal. After receiving the DHCP Release message, the DHCP server reclaims the allocated IP address.

It should be noted that the operations performed by the DHCP relay in the foregoing embodiments may be performed by any other device in the access network only if such a device is the same physical device as the PMIP client or is interconnected with the PMIP client.

Figure 7:
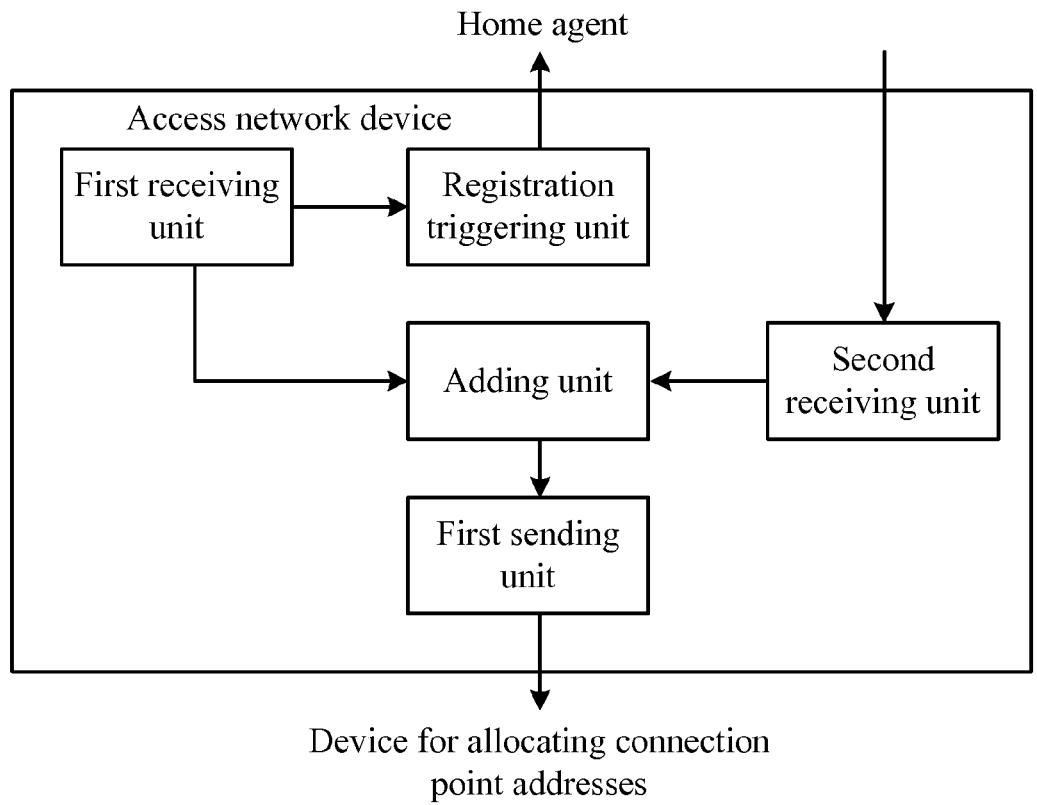
FIG. 7 shows a structure of an access network device according to embodiment 7 of the present invention.

The embodiment 7 of the present invention relates to an access network device. As shown in FIG. 7, the access network device includes: a first receiving unit, configured to receive a request for an IP address of a terminal; a registration triggering unit, configured to prompt MIP registration procedures of the terminal; a second receiving unit, configured to receive a MIP registration result of the terminal; and a first sending unit, configured to send the MIP registration result received by the second receiving unit and the request for an IP address of the terminal to the device for allocating connection point addresses. The MIP registration result is sent to the device for allocating connection point addresses, thus preventing the device for allocating connection point addresses from ineffectively allocating IP addresses when the terminal MIP registration fails, preventing transmission errors of subsequent messages of the terminal, and saving IP address resources.

The access network device may further include an adding unit, which is configured to add the MIP registration result received by the second receiving unit to the request for an IP address of the terminal, whereupon the first sending unit of the access network device sends the request with the MIP registration result to the device for allocating connection point addresses.

The MIP registration result may be carried in the suboption of an option indicative of relay information in the request for an IP address of the terminal, for example, Option 82 in the DHCP Request message, or carried in the option indicative of the registration result in the request for an IP address of the terminal, and is sent to the device for allocating connection point addresses. This practice involves few modifications to the prior protocol, and is rather convenient.

The access network device may further include: a third receiving unit, configured to receive an IP address allocation response from the device for allocating connection point addresses; a registration canceling unit, configured to prompt procedures of canceling MIP registration of the terminal; and a first judging unit, configured to judge the MIP registration result received by the second receiving unit and the response received by the third receiving unit, and if the MIP registration result is registration success and the received response is IP address allocation failure, instruct the registration canceling unit to prompt the procedures of canceling MIP registration of the terminal, thus preventing transmission errors of subsequent messages of the terminal.

The access network device may further include: a second sending unit, configured to send the request for an IP address of the terminal received by the first receiving unit to the device for allocating connection point addresses; a third receiving unit, configured to receive an IP address allocation response from the device for allocating connection point addresses; and a second judging unit, configured to judge the MIP registration result received by the second receiving unit and the response received by the third receiving unit, and if the response is IP address allocation success and the registration result is registration failure, instruct the first sending unit to send the request for an IP address of the terminal and the MIP registration result to the device for allocating connection point addresses. In this way, transmission errors of subsequent messages of the terminal never occur when the MIP registration fails. Moreover, the terminal does not send the request for an IP address repeatedly in the case of receiving no response from the device for allocating connection point addresses in a long period, thus saving transmission resources.

It should be noted that all units in this embodiment are logical units, but in practice, such logical units may be implemented in different physical forms.

Figure 8:
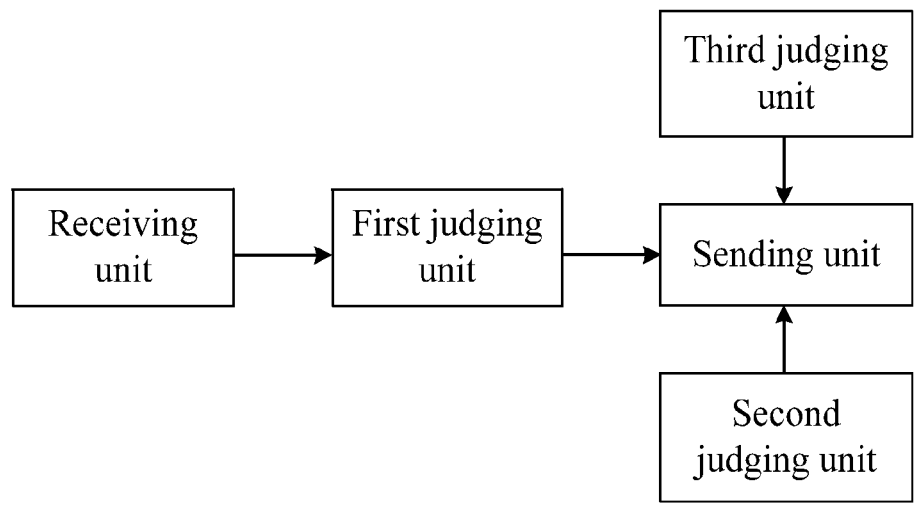
FIG. 8 shows a structure of a device for allocating a connection point address according to embodiment 8 of the present invention.

The embodiment 8 of the present invention relates to a device for allocating a connection point address. As shown in FIG. 8, the device includes: a receiving unit, configured to receive a request for an IP address of a terminal and a MIP registration result of the terminal; a sending unit, configured to return an IP address allocation response to the terminal; and a first judging unit, configured to judge whether the MIP registration result received by the receiving unit is registration failure, and, if so, instruct the sending unit to return a response indicative of IP address allocation failure to the terminal. In this way, transmission errors of subsequent messages of the terminal never occur when the MIP registration fails. Moreover, the terminal does not send the request for an IP address repeatedly in the case of receiving no response from the device for allocating connection point addresses in a long period, thus saving transmission resources.

The receiving unit in the device for allocating connection point addresses obtains the MIP registration result of the terminal from the request for an IP address of the terminal.

The device for allocating connection point addresses may further include a second judging unit, which is configured to judge whether the IP address requested by the terminal has been allocated, and, if the requested IP address has been allocated, instruct the sending unit to return a response indicative of IP address allocation failure to the terminal; and judge whether the terminal meets the conditions for allocating the IP address, and, if the conditions are not met, instruct the sending unit to return a response indicative of IP address allocation failure to the terminal.

When the first judging unit determines that the registration result received by the receiving unit is registration success and the second judging unit determines that the IP address requested by the terminal is unallocated and the terminal meets the allocation conditions, the sending unit of the device for allocating connection point addresses returns a response indicative of IP address allocation success to the terminal, and allocates the IP address to the terminal.

The device for allocating connection point addresses may further include: an IP address managing unit, configured to reclaim the allocated IP addresses; and a third judging unit, when the first judging unit determines that the MIP registration result received by the receiving unit is registration failure, the third judging unit is configured to judge whether a request for an IP address of another independent terminal has been received and the IP address has been allocated to the another independent terminal before the receiving unit receives the request for an IP address and the MIP registration result; and if so, instruct the IP address managing unit to reclaim the allocated IP address, thus avoiding a waste of IP address resources.

It should be noted that all units in this embodiment are logical units, but in practice, such logical units may be implemented in different physical forms.

Figure 9:
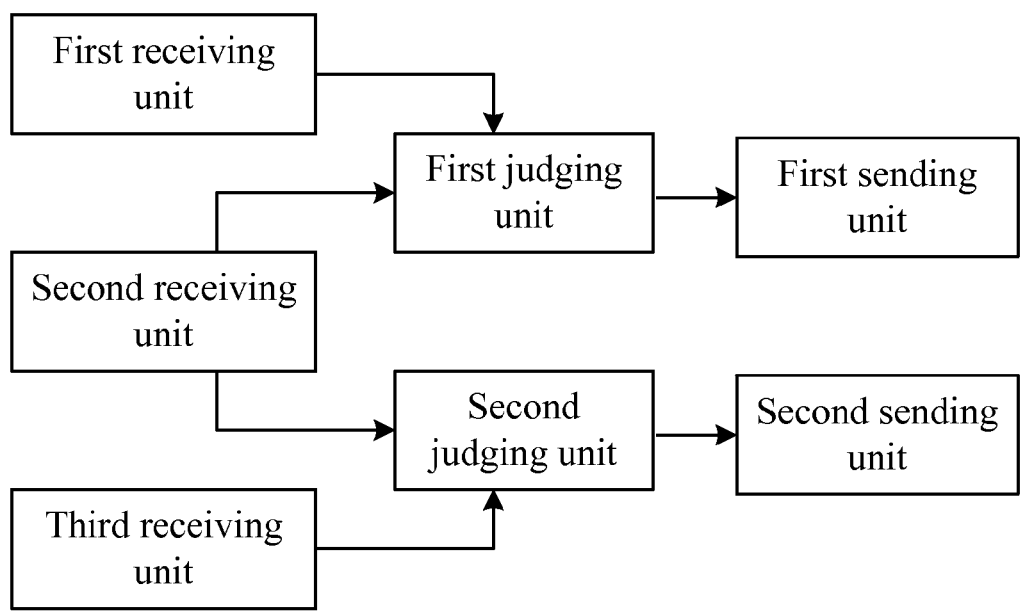
FIG. 9 shows a structure of an access network device according to embodiment 9 of the present invention.

The embodiment 9 of the present invention relates to an access network device. As shown in FIG. 9, the device includes: a first receiving unit, configured to receive a request for an IP address of a terminal; a second receiving unit, configured to receive a MIP registration result of the terminal; a first sending unit, configured to return an IP address allocation response to the terminal; and a first judging unit, configured to judge the results received by the first receiving unit and the second receiving unit, and instruct the first sending unit to return a response indicative of IP address allocation failure if the first receiving unit receives a request for an IP address of the terminal and the second receiving unit receives a MIP registration result indicative of registration failure.

The access network device may further include: a third receiving unit, configured to receive an IP address allocation response from the device for allocating connection point addresses; a second sending unit, configured to send a message indicative of IP address release to the device for allocating connection point addresses; and a second judging unit, configured to judge the response received by the third receiving unit and the MIP registration result received by the second receiving unit, and if the response received by the third receiving unit is IP address allocation success and the MIP registration result received by the second receiving unit is registration failure, instruct the second sending unit to send a message indicative of IP address release to the device for allocating connection point addresses.

It should be noted that all units in this embodiment are logical units, but in practice, such logical units may be implemented in different physical forms.

To sum up, in the embodiments of the present invention, after receiving a request for an IP address from the terminal, an access network device, for example an DHCP relay, initiates the MIP registration procedures of the terminal, and sends the MIP registration result together with the request for an IP address of the terminal to a device for allocating connection point addresses, for example a DHCP server. If the MIP registration result received by the DHCP server is registration failure, the DHCP server returns a NAK response to the terminal directly, indicating that the IP address allocation fails. In this way, transmission errors of subsequent messages of the terminal never occur when the MIP registration fails. Moreover, the terminal does not send the request for an IP address repeatedly in the case of receiving no response from the DHCP server in a long period, thus saving transmission resources.

The MIP registration result is sent to the DHCP server, thus preventing the DHCP server from ineffectively allocating IP addresses when the terminal registration fails, and saving IP address resources.

The MIP registration procedures of the terminal may be initiated immediately after the request for an IP address is received from the terminal, and the MIP registration result can be sent together with this request to the DHCP server; or, the request for an IP address of the terminal is sent to the DHCP server before the MIP registration procedures of the terminal is initiated. If the response returned by the DHCP server is IP address allocation success and the MIP registration result is registration failure, the registration result has been carried in the request for an IP address of the terminal, and sent to the DHCP server again. In this way, the implementation is flexible and the application is convenient.

The MIP registration result may be carried in the suboption of an option (Option 82) indicative of relay information in the DHCP Request message, and is sent to the DHCP server. This practice involves few modifications to the prior protocol, and is rather convenient.

After the MIP registration succeeds, if the DHCP server allocates the IP address unsuccessfully, procedures of canceling the MIP registration of the terminal is prompted to prevent transmission errors of subsequent messages of the terminal.

If the DHCP server has sent a response indicative of IP address allocation success to the terminal and has allocated the IP address to the terminal when determining that the MIP registration of the terminal fails, the DHCP server reclaims the allocated IP address after returning a response indicative of IP address allocation failure to the terminal, thus avoiding a waste of IP address resources.

The access network device such as a DHCP relay makes a judgment according to the MIP registration result. If the registration result is registration failure, after the DHCP server returns a response indicative of IP address allocation success, the DHCP relay modifies the response from an ACK to a NAK response indicative of IP address allocation failure. In this way, the transmission of subsequent messages of the terminal will not be erroneous when the MIP registration fails.

When modifying the ACK response, the access network device sends a message indicative of IP address release to the DHCP server, thus preventing the idleness and waste of the IP address resources of the DHCP server.

It is understandable to those skilled in the art that all or part of the steps in the foregoing embodiments may be implemented by hardware instructed by a program. The program may be stored in a computer-readable storage medium such as a Read Only Memory (ROM), a Random Access Memory (RAM), a magnetic disk, or a Compact Disk (CD).

Although the invention has been described through several exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for requesting a connection point address, comprising:
   receiving a request for an Internet Protocol (IP) address of a terminal;
   prompting Mobile IP (MIP) registration procedures of the terminal, and receiving a MIP registration result; and
   sending the request for an IP address of the terminal with the MIP registration result to a Dynamic Host Configuration Protocol (DHCP) server.

2. The method of claim 1, wherein the sending request for an IP address of the terminal with the MIP registration result to the DHCP server comprises:
   adding the registration result to the request for an IP address of the terminal, and sending the request to the DHCP server.

3. The method of claim 2, wherein after adding the registration result to the request for an IP address of the terminal and sending the request to the DHCP server, the method further comprises:
   receiving an IP address allocation response from the DHCP server; and
   prompting procedures of canceling MIP registration of the terminal if the registration result is registration success and the response is IP address allocation failure.

4. The method of claim 2, wherein before adding the registration result to the request for an IP address of the terminal and sending the request to the DHCP server, the method further comprises:
   sending the request for an IP address of the terminal to the DHCP server, and receiving an IP address allocation response from the DHCP server; and
   adding the registration result to the request for an IP address of the terminal and sending the request to the DHCP server if the response is IP address allocation success and the registration result is registration failure.

5. A method for allocating a connection point address, comprising:
   receiving a request for an Internet Protocol (IP) address of a terminal with a Mobile IP (MIP) registration result of the terminal; and
   returning a response indicative of IP address allocation failure to the terminal if the registration result is registration failure.

6. The method of claim 5, comprising:
   receiving, by a Dynamic Host Configuration Protocol (DHCP) server, a request for an Internet Protocol (IP) address of a terminal with a Mobile IP (MIP) registration result of the terminal; and
   returning, by the DHCP server, a response indicative of IP address allocation failure to the terminal if the registration result is registration failure.

7. The method of claim 6, wherein after receiving, by the DHCP server, the request for an IP address of the terminal with the MIP registration result of the terminal, the method further comprises:
   returning the response indicative of IP address allocation failure to the terminal if the IP address requested by the terminal has been allocated;
   returning the response indicative of IP address allocation failure to the terminal if the terminal does not meet conditions for allocating the IP address; or
   returning a response indicative of IP address allocation success to the terminal and allocating the IP address to the terminal if the MIP registration result is registration success, and the IP address requested by the terminal is unallocated, and the terminal meets the conditions for allocating the IP address.

8. The method of claim 6, wherein if the MIP registration result received by the DHCP server is registration failure, the method further comprises:
   reclaiming an allocated IP address if the DHCP server has received a request for an IP address of another independent terminal, has sent a response indicative of IP address allocation success to the another independent terminal and has allocated the IP address to the another independent terminal before receiving the request for an IP address of the terminal with the MIP registration result.

9. The method of claim 5, comprising:
   receiving, by an access network device, a request for an Internet Protocol (IP) address of a terminal with a Mobile IP (MIP) registration result of the terminal; and
   returning, by the access network device, a response indicative of IP address allocation failure to the terminal if the registration result is registration failure;

wherein after receiving the request for an IP address of the terminal, the method further comprises:

forwarding, by the access network device, the received request for an IP address of the terminal to a Dynamic Host Configuration Protocol (DHCP) server, and receiving the IP address allocation response from the DHCP server; and prompting MIP registration procedures of the terminal;

after receiving the MIP registration result of the terminal, the method further comprises:

sending, by the access network device, a message indicative of IP address release to the DHCP server if the registration result is registration failure and the IP address allocation response from the DHCP server is IP address allocation success.

10. An access network device, comprising:
a first receiving unit, configured to receive a request for an Internet Protocol (IP) address of a terminal;
a registration triggering unit, configured to prompt Mobile IP (MIP) registration procedures of the terminal;
a second receiving unit, configured to receive a MIP registration result of the terminal; and
a first sending unit, configured to send the MIP registration result received by the second receiving unit and the request for an IP address of the terminal to a device for allocating connection point addresses.

11. The access network device of claim 10, further comprising:
an adding unit, configured to add the MIP registration result received by the second receiving unit to the request for an IP address of the terminal, whereupon the first sending unit sends the request with the MIP interpolated registration result to the device for allocating connection point addresses.

12. The access network device of claim 10, further comprising:
a third receiving unit, configured to receive an IP address allocation response from the device for allocating connection point addresses;
a registration canceling unit, configured to prompt procedures of canceling MIP registration of the terminal; and
a first judging unit, configured to judge the MIP registration result received by the second receiving unit and the response received by the third receiving unit; if the MIP registration result is registration success and the response is IP address allocation failure, instruct the registration canceling unit to prompt the procedures of canceling MIP registration of the terminal.

13. The access network device of claim 10, further comprising:
a second sending unit, configured to send the request for an IP address of the terminal received by the first receiving unit to the device for allocating connection point addresses;
a third receiving unit, configured to receive an IP address allocation response from the device for allocating connection point addresses; and
a second judging unit, configured to judge the MIP registration result received by the second receiving unit and the response received by the third receiving unit; if the response is IP address allocation success and the registration result is registration failure, instruct the first sending unit to send the request for an IP address of the terminal with the MIP registration result of the terminal to the device for allocating connection point addresses.

14. A device for allocating a connection point address, comprising:
a receiving unit, configured to receive a request for an Internet Protocol (IP) address of a terminal and a Mobile IP (MIP) registration result of the terminal;
a sending unit, configured to return an IP address allocation response to the terminal; and
a first judging unit, configured to judge whether the MIP registration result received by the receiving unit is registration failure, and, if the registration result is registration failure, instruct the sending unit to return a response indicative of IP address allocation failure to the terminal.

15. The device of claim 14, further comprising:
a second judging unit, configured to judge whether the IP address requested by the terminal has been allocated, and, if the requested IP address has been allocated, instruct the sending unit to return the response indicative of IP address allocation failure to the terminal; and judge whether the terminal meets conditions for allocating the IP address, and, if the conditions are not met, instruct the sending unit to return the response indicative of IP address allocation failure to the terminal.

16. The device of claim 14, further comprising:
an IP address managing unit, configured to reclaim an allocated IP address; and
a third judging unit, when the first judging unit determines that the MIP registration result received by the receiving unit is registration failure, the third judging unit configured to judge whether a request for an IP address of another independent terminal has been received and the IP address has been allocated to the another independent terminal before the receiving unit receives the request for an IP address with the MIP registration result; if so, instruct the IP address managing unit to reclaim the allocated IP address.

17. An access network device, comprising:
a first receiving unit, configured to receive a request for an Internet Protocol (IP) address of a terminal;
a second receiving unit, configured to receive a Mobile IP (MIP) registration result of the terminal;
a first sending unit, configured to return an IP address allocation response to the terminal; and
a first judging unit, configured to judge the result received by the first receiving unit and the second receiving unit; and instruct the first sending unit to return a response indicative of IP address allocation failure if the first receiving unit receives the request for an IP address of the terminal and the second receiving unit receives a MIP registration result indicative of registration failure.

18. The access network device of claim 17, further comprising:
a third receiving unit, configured to receive the IP address allocation response from a device for allocating connection point addresses;
a second sending unit, configured to send a message indicative of IP address release to the device for allocating connection point addresses;
a second judging unit, configured to judge the response received by the third receiving unit and the MIP registration result received by the second receiving unit; if the response received by the third receiving unit is IP address allocation success and the MIP registration result received by the second receiving unit is registration failure, instruct the second sending unit to send the message indicative of IP address release to the device for allocating connection point addresses.

* * * * *